United States Patent
Wilson

(10) Patent No.: US 9,287,781 B2
(45) Date of Patent: Mar. 15, 2016

(54) SINGLE INDUCTOR MULTIPLE OUTPUT CONVERTER

(75) Inventor: Martin Paul Wilson, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 12/992,742

(22) PCT Filed: May 15, 2009

(86) PCT No.: PCT/EP2009/055951
§ 371 (c)(1),
(2), (4) Date: Jun. 14, 2011

(87) PCT Pub. No.: WO2009/138505
PCT Pub. Date: Nov. 19, 2009

(65) Prior Publication Data
US 2012/0043947 A1    Feb. 23, 2012

(30) Foreign Application Priority Data

May 15, 2008 (GB) .................................. 0808873.4

(51) Int. Cl.
*H02M 3/158* (2006.01)
*H02M 1/00* (2007.01)

(52) U.S. Cl.
CPC .......... *H02M 3/1582* (2013.01); *H02M 3/1588* (2013.01); *H02M 2001/009* (2013.01); *Y02B 70/1466* (2013.01)

(58) Field of Classification Search
CPC ............ H02M 3/1582; H02M 3/1588; H02M 2001/009; H02M 3/1584; Y02B 70/1466; G01R 19/0084; G05F 1/62

USPC ........... 323/259, 267, 282, 285, 344; 307/12, 307/31, 32, 38, 109
See application file for complete search history.

(56) References Cited

U.S. PATENT DOCUMENTS

| | | | |
|---|---|---|---|
| 2004/0135562 A1* | 7/2004 | Oden | 323/282 |
| 2004/0150483 A1 | 8/2004 | Cho | |
| 2004/0160715 A1* | 8/2004 | Premont et al. | 361/90 |
| 2006/0176031 A1* | 8/2006 | Forman | H02M 3/158 323/267 |
| 2008/0055946 A1* | 3/2008 | Lesso et al. | 363/63 |
| 2009/0108823 A1* | 4/2009 | Ho et al. | 323/282 |

(Continued)

FOREIGN PATENT DOCUMENTS

EP   1 876 694 A1   1/2008

OTHER PUBLICATIONS

Sharma et al., "A Single Inductor Multiple Output Converter with Adaptive Delta Current Mode Control", "2006 IEEE International Symposium on Circuits and Systems May 21-24, 2006 Island of Kos, Greece (IEEE Cat. No. 06CH37717C)", May 21, 2006, pp. 5643-5646, Publisher: IEEE, XP010940033 , Published in: Piscataway , NJ, USA.

(Continued)

*Primary Examiner* — Fred E Finch, III
*Assistant Examiner* — Gustavo Rosario Benitez

(57) ABSTRACT

There is disclosed a buck-boost converter comprising a voltage generation apparatus comprising: a voltage source; an inductor, wherein a first terminal of the inductor is switchably connected to the voltage source; and a plurality of capacitors switchably connected to a second terminal of the inductor, wherein a respective plurality of voltages are formed across the plurality of capacitors.

19 Claims, 9 Drawing Sheets

(56) References Cited

U.S. PATENT DOCUMENTS

2009/0140706 A1* 6/2009 Taufik ............... H02M 3/1584
   323/272
2010/0002473 A1* 1/2010 Williams ............. H02M 3/158
   363/21.06

OTHER PUBLICATIONS

Dongsheng Ma et al., "Single-inductor multiple-outputs switching converters with bipolar outputs", "ISCAS 2001. Proceedings of the 2001 IEEE International Symposium on Circuits and Systems, Sydney, Australia, May 6-9, 2001", May 6, 2001, pp. 301-304, vol. 3, ISBN: 978-0-7803-6685-5, p. 302-303, Publisher: IEEE International symposium on circuits and systems, XP010541136, Published in: New York, NY, USA.

Wing-Hung Ki et al., "Single-inductor multiple-output switching converters", "32nd Annual IEEE Power Electronics Specialists Conference Proceedings. Vancouver, Canada, Jun. 17-21, 2001", Jun. 17, 2001, pp. 226-231, vol. 1, ISBN: 978-0-7803-7067-8, pp. 227-229, figure 5c, Publisher: IEEE Annual Power Electronics Specialists Conference. PESC 2001, XP010559152, Published in: New York, NY, USA.

Koon S-C et al., "Integrated charge-control single-inductor dual-output step-up/step-down converter", "Integrated Power electronics laboratory department of electrical and electronic engineering, Hong Kong University of Science and Technology", May 23, 2005, pp. 3071-3074, ISBN: 978-0-7803-8834-5, Publisher: IEEE, Published in: Clear Water Bay, Hong Hong SAR, China.

"British Search Report for International Application No. GB0808873.4", Sep. 15, 2008, Publisher: UK Intellectual Property Office, Published in: GB.

Duan Wenting, "Related Chinese Patent Application No. CN2009801252420 Office Action", Dec. 3, 2012, Publisher: CIPO, Published in: CN.

Wenting Duan, "Related Chinese Patent Application No. 200980125242.0 First Search Report", Nov. 22, 2012, Publisher: SIPC, Published in: CN.

International Search Report and Written Opinion—PCT/EP2009/055951—ISA/EPO—Aug. 10, 2009.

* cited by examiner $$Vbatt \leq \frac{1}{tcycle} \sum_{n=1\_p} Vntn$$

FIG. 8

SINGLE INDUCTOR MULTIPLE OUTPUT CONVERTER

BACKGROUND TO THE INVENTION

1. Field of the Invention

The invention is directed to the provision of multiple voltages, and particularly to an efficient power management method and apparatus for providing multiple supply voltages from a single voltage source.

2. Description of the Related Art

In modern fourth generation wireless handset solutions, there is an expectation that a power management integrated circuit (PMIC) will generate an array of voltages of different values for powering various blocks, including for example digital cores, inputs/outputs, analogue circuits and power amplification stages. These blocks will have different voltage requirements. The voltages will be required to be generated from a single lithium ion cell having a terminal voltage with a typical value between 2.6V and 5.5V.

In order to provide this a so-called H-bridge buck-boost topology, as illustrated in FIG. 1, is typically provided.

With reference to FIG. 1, there is shown a voltage generation stage 100. A voltage source 110, typically a battery, provides an input voltage on line 112. The switching elements consist of a buck section 104 formed by switches 102 and 103, and a boost section 109 formed by switches 105 and 106. Capacitor 107 is a capacitive storage element and inductor 108 is an inductive storage element. The voltage source 110 has an exemplary voltage supply of 2.5V. Supply stage 100 has to switch between buck and boost modes if the output voltage is required to be greater than 2.5V.

In boost mode, the voltage source 110, typically a battery, has a value which is lower than a desired voltage at the output. In buck mode the voltage source has a value which is higher than a desired voltage at the output.

A problem with the topology such as illustrated in FIG. 1 is that a separate voltage generation stage 100 must be used for each voltage required. Thus the entire circuit of FIG. 1 must be replicated for each required voltage. This results in a number of buck-boost circuits, and an associated proliferation of inductors. This adds to cost, takes up space, and generates interference.

In order to overcome these problems, in the prior there has been proposed approaches to improve power management ICs. These approaches include: the provision of on-chip inductors; switched capacitor solutions; and multi-winding transformers.

By fabricating inductors on-chip it is possible to gain some miniaturisation. However on-chip inductors have a high series resistance that hampers their usage in high current supplies. Also, a number of supplies would demand considerable IC area.

Switched capacitors enable the creation of switched mode supplies without a single inductor. These generally work very well at low currents, but at high currents the value of capacitance required dominates the chip fabrication area. If off-chip capacitors are used, the track inductance between the on-chip switches and off-chip capacitors becomes a severe problem, and as most of the switched capacitor elements are floating then serious electromagnetic induction (EMI) is generated. Because of the number of switching elements required, efficiency is generally less than an inductor based buck-boost supply.

A prior art multi-winding transformer technique is a transformer-coupled forward or flyback converter, with multiple windings or taps that are rectified to give a set of DC voltages. However such an arrangement has a number of problems. It is difficult to independently regulate each supply. A specialised transformer needs to be wound, rather than being able to use off the shelf inductors. The arrangement is inflexible: if one of the supply voltages needs to be changed, this requires a transformer redesign.

It is an aim of the invention to provide an improved power management arrangement for the provision of multiple voltage levels.

SUMMARY OF THE INVENTION

In one aspect the invention provides a voltage generation apparatus comprising: a voltage source; an inductor, wherein a first terminal of the inductor is switchably connected to the voltage source; and a plurality of capacitors switchably connected to a second terminal of the inductor, wherein a respective plurality of voltages are formed across the plurality of capacitors.

Each of the plurality of capacitors may be connected to electrical ground.

Each of the plurality of capacitors may be connected to a second voltage that is a selection of one of the plurality of voltages. In such an arrangement the second voltage for one capacitor may be electrical ground.

The second terminal of the inductor may be further switchably connected to electrical ground. The first terminal of the inductor may be further switchably connected to electrical ground. The voltage generation circuit may further include control means for controlling a set of switches providing the switchably controllable functionality.

The control means may be adapted to sequentially connect each capacitor to the second terminal of the inductor. The control means may be further adapted, in a voltage boost cycle, to disconnect the second terminal of the inductor from the electrical ground when any of the plurality of capacitors are connected to the second terminal of the inductor.

The control means may be further adapted, in a voltage boost cycle, to connect the second terminal of the inductor to ground and disconnect all of the plurality of capacitors from the second terminal of the inductor, to precharge the inductor. The control means may be further adapted, in a voltage boost cycle, to connect the first terminal of the inductor to the voltage source and disconnect the second terminal of the inductor from electrical ground.

The control means may be further adapted, in a voltage buck cycle, to disconnect the second terminal of the inductor from electrical ground. The control means may be further adapted, in a voltage buck cycle, to selectively connect the first terminal of the inductor to either the voltage source or electrical ground.

Each of the plurality of capacitors may be connected to the second terminal of the inductor in a cycle.

The control means may be adapted to select between a buck and boost cycle on initiation of each cycle. The selection may be dependent upon a criteria.

In accordance with the invention there is further provided a method of generating a plurality of voltages in a voltage generation apparatus comprising: selectively connecting a voltage source to a first terminal of an inductor; selectively connecting one of a plurality of capacitors to a second terminal of the inductor, wherein a respective plurality of voltages are formed across the plurality of capacitors.

The method according may further comprise connecting each of the plurality of capacitors to electrical ground.

The method may further comprise selectively connecting the second terminal of the inductor to electrical ground.

The method may further comprise selectively connecting the first terminal of the inductor to electrical ground.

The method may further include controlling a set of switches providing the switchably controllable functionality.

The method may further comprise sequentially connecting each capacitor to the second terminal of the inductor.

The method may further comprise, in a voltage boost cycle, disconnecting the second terminal of the inductor from the electrical ground when any of the plurality of capacitors are connected to the second terminal of the inductor.

The method may further comprise, in a voltage boost cycle, connecting the second terminal of the inductor to ground and disconnecting all of the plurality of capacitors from the second terminal of the inductor, to precharge the inductor.

The method according may further comprise, in a voltage boost cycle, connecting the first terminal of the inductor to the voltage source and disconnecting the second terminal of the inductor from electrical ground.

The method may further comprise, in a voltage buck cycle, disconnecting the second terminal of the inductor from electrical ground.

The method may further comprise, in a voltage buck cycle, selectively connecting the first terminal of the inductor to either the voltage source or electrical ground.

The method may further comprise connecting each of the plurality of capacitors to the second terminal of the inductor in a cycle.

The method may further comprise selecting between a buck and boost cycle on initiation of each cycle.

The may further comprise selecting between a buck and boost cycle in dependence upon a criteria.

The method, or the apparatus, may comprise the step of selectively connecting one of a plurality of capacitors to a second terminal of the inductor comprises, for a given voltage level, generate an error signal representing the difference between the current output voltage level and a reference level; and comparing the error signal to a ramp signal, wherein the capacitor for said voltage level is selectively connected in dependence on the comparing step.

The method, or the apparatus, may comprise the step of selectively connecting one of a plurality of capacitors to a second terminal of the inductor comprises, for a given voltage level, generate an error signal representing the difference between the current output voltage level and a reference level; and comparing the error signal to a current level in the inductor, wherein the capacitor for said voltage level is selectively connected in dependence on the comparing step.

The capacitor may be connected on initialisation of said comparing step, and disconnected when in dependence on the comparing step indicating a change.

BRIEF DESCRIPTION OF THE DRAWINGS

The invention will now be described with reference to the accompanying drawings in which:

FIG. 8 illustrates the relationship between the voltage source and an average voltage across the plurality of voltages in selecting between a buck and a boost cycle;

DESCRIPTION OF THE PREFERRED EMBODIMENTS

Figure 1:
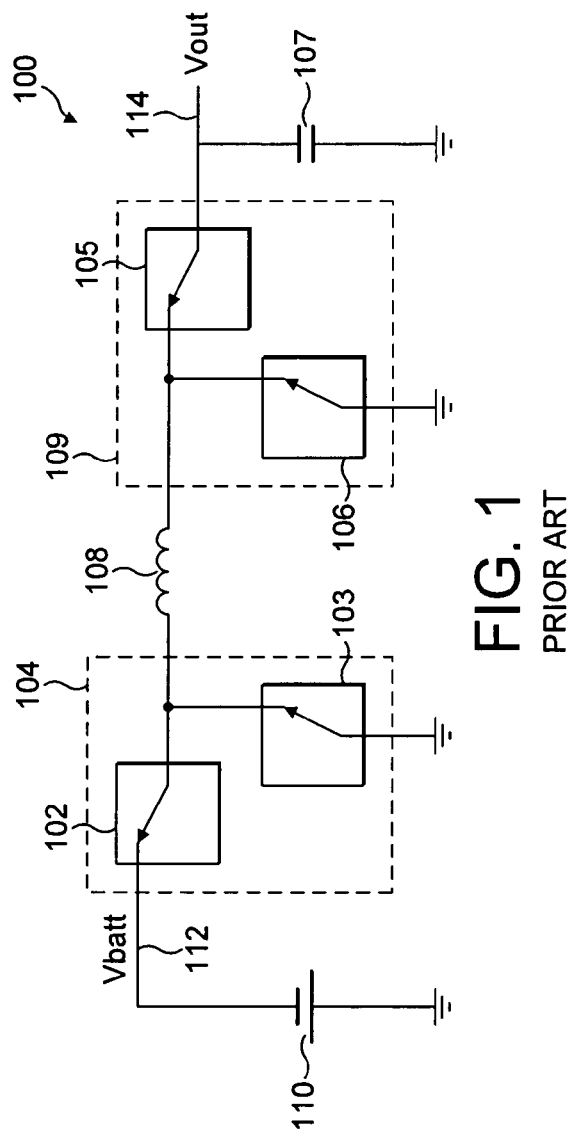
FIG. 1 illustrates a buck-boost converter as known in the prior art.

The present invention is now described by way of example with reference to exemplary embodiments. One skilled in the art will appreciate that embodiments are described for ease of understanding the invention, and the invention is not limited to details of any embodiment described. The scope of the invention is defined by the appended claims.

In the following description where the same reference numerals are used in different Figures, they denote an element in one Figure which corresponds to an element in another Figure.

Figure 2:
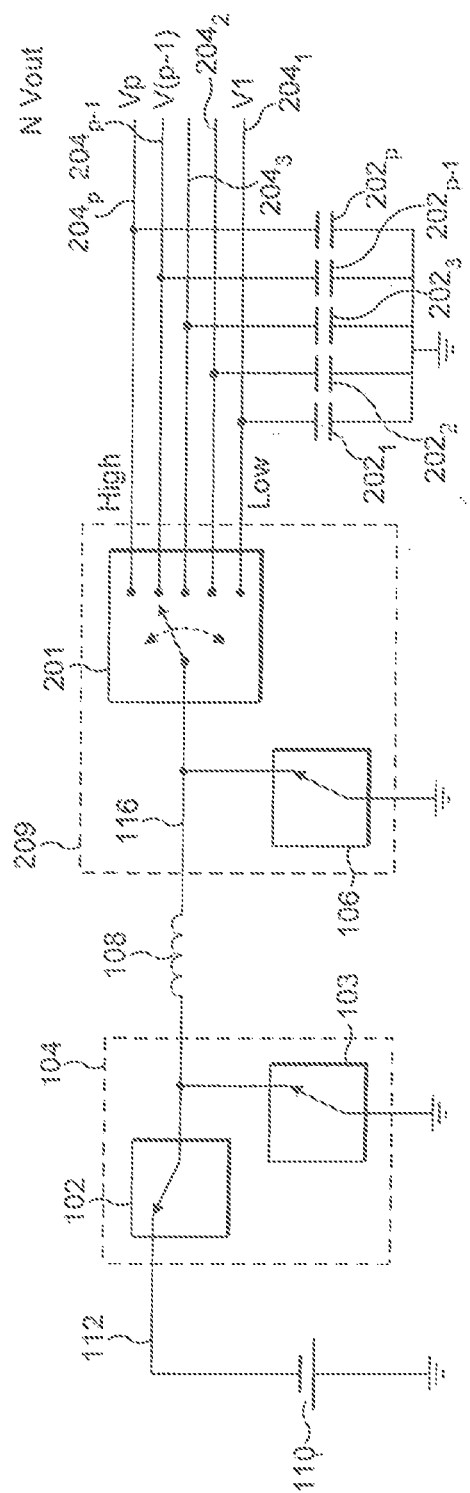
FIG. 2 illustrates a buck-boost converter embodying the principles of the present invention.

With reference to FIG. 2, there is illustrated a voltage supply stage in accordance with an embodiment of the invention.

The invention provides a single assembly of switches and capacitors in combination with a single inductor to generate a plurality of supply voltages from a single voltage source.

With reference to FIG. 2, the power supply stage includes a buck stage 104 including switches 102 and 103, and a boost stage 209. The boost stage includes the switch 106 and a switch array 201. The inductor 108 of FIG. 1 is provided. The capacitor 107 of FIG. 1 is replaced by a plurality p of capacitors, $202_1$ to $202_p$. The switch array 201 connects the signal on line 116 at its input to one of a plurality p of output lines $204_1$ to $204_p$. Each of the capacitors $202_1$ to $202_p$ is connected between a respective one of the output lines $204_1$ to $204_p$ and ground.

The three switches 102, 103, 106 and inductor 108 are the same as in the conventional buck-boost arrangement of FIG. 1. The switch 102 selectively connects the voltage supply (battery 110) to a first terminal of the inductor. The switch 103 selectively connects the first terminal of the inductor 108 to ground. The switch 106 selectively connects the second terminal of the inductor 108 to ground.

Switch array 201 replaces switch 105 of FIG. 1 as noted above. Switch array 201 is controlled to connect each capacitor $202_1$ to $202_p$ in turn to the second terminal of inductor 108 on line 116.

The inductance of inductor 108 allows current to flow regardless of which of capacitors $202_1$ to $202_p$ is connected. When switch 201 is disconnected from a supply, the relevant supply capacitor will allow current to flow into a respective load connected to the respective output line $204_1$ to $204_p$.

The longer any one of the capacitors $202_1$ to $202_p$ is connected to the inductor 108, the higher the respective supply voltage on the respective output voltage line $204_1$ to $204_p$ will climb. Therefore, there is provided scope for regulation of each individual supply on lines $204_1$ to $204_p$.

In practice, when the switch array 201 is connected to charge a particular capacitor, the voltage formed on the associated output line is monitored and compared to a reference level. When the voltage reaches the reference level (which may correspond to the desired voltage level), the switch array may switch to charge the next capacitor.

The output voltage formed on any voltage output line is preferably compared to a ratioed version of the material band gap, and it can then be made very accurate and easily changed.

Buck-boost converters are known to be used with either voltage mode control or current mode control. The buck-boost converter in accordance with the present invention is described firstly in accordance with a voltage mode control, and secondly in accordance with a more advanced current or charge control method especially tailored for the inventive topology.

Figure 8:
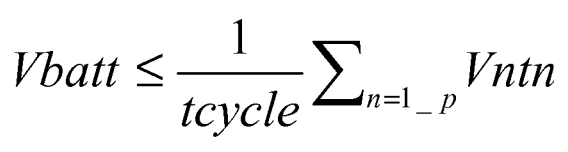

As discussed above, the converter operates in either buck mode or boost mode. The boundary between buck mode and boost mode is defined by the following relationship, as also shown in FIG. 8:

$$Vbatt \le \frac{1}{tcycle} \sum_{n=1\_p} Vntn \qquad \text{Equation 1}$$

where:
Vbatt is the battery (or supply) voltage;
Vn is the nth voltage output;
tn is the time spent at the $n^{th}$ voltage output;
tcycle is the cycle period;
p is the number of supply voltages used.

Thus it can be understood that Equation 1 compares the battery voltage with the average voltage across all output lines.

It is a preferable feature of embodiments of the invention that the buck-boost converter automatically switches between buck mode and boost mode according to the above relationship. At the start of each PWM cycle a boost or buck mode is preferably initiated in dependence on the state of Equation 1.

A preferred embodiment in a voltage mode control is now described for a boost mode of operation.

In boost mode, switch 102 is continuously 'on' and switch 103 continuously 'off'. Thus the battery 110 is connected to the first terminal of the inductor 108 during a boost cycle.

It should further be noted that the arrangement of FIG. 2 in which each capacitor is connected between an output line (or output voltage) and ground is exemplary. In an alternative, for example, each capacitor may be connected between an upper voltage level and a lower voltage level. In one arrangement, each capacitor may be connected between an upper voltage level and an adjacent lower voltage level, with one capacitor connected between the lowest voltage level and ground.

Figure 10:
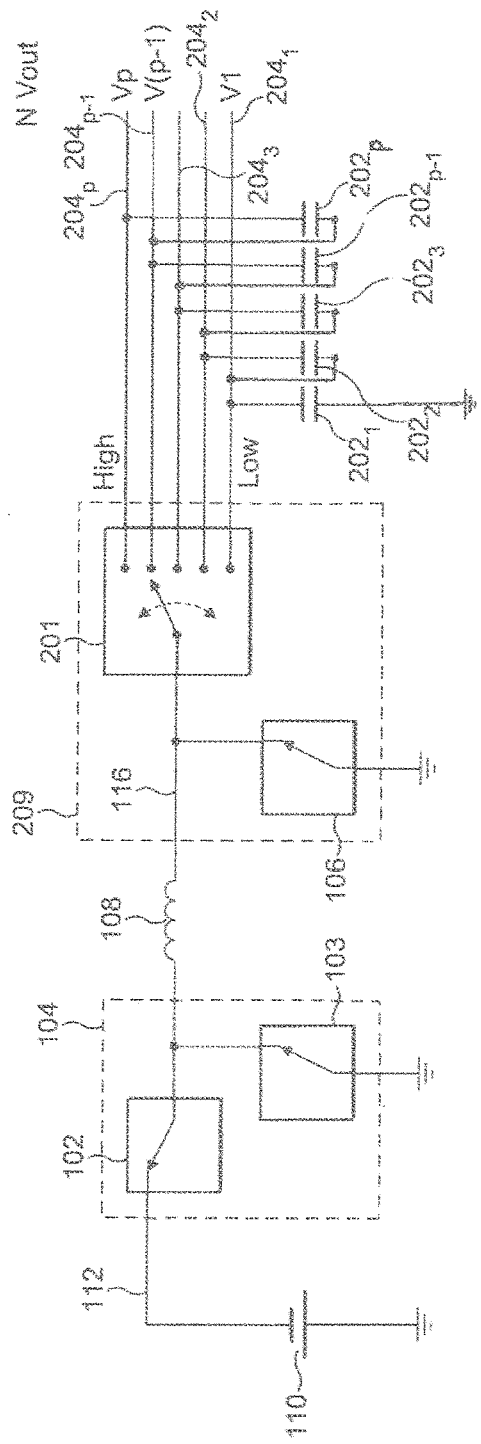
FIG. 10 illustrates a buck-boost converter embodying the principles of the present invention.

Thus, with reference to FIG. 10, in an alternative to FIG. 2: capacitor $202_p$ may be connected between lines $204_p$ and $204_{p-1}$; capacitor $202_{p-1}$ may be connected between lines $204_{p-1}$ and $204_3$; capacitor $202_3$ may be connected between lines $204_3$ and $304_2$; capacitor $202_2$ may be connected between output lines $204_2$ and $204_1$; and capacitor $202_1$ may be connected between output lines $204_1$ and electrical ground.

Figure 3:
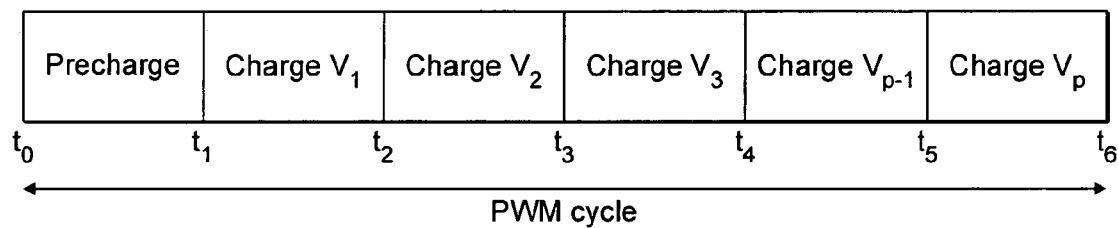
FIG. 3 illustrates a PWM cycle in boost mode for the buck-boost converter of FIG. 2.

FIG. 3 is an illustration of the operation sequences of the switch array 201. The cycle starts with all switches of the switch array 201 open, and switch 106 is closed. FIG. 3 shows that this connection is maintained from time to to/time $t_1$. During this time, referred to as the precharge period, the inductor 108 is precharged.

For ease of illustration, in the simple example given herein it is assumed that the voltages are boosted in the sequence $V_1$ to $V_p$. This represents a given voltage sequence, and does not suggest an order based on voltage levels. The boost of the p voltages may be in any desired order. The actual voltage sequence may be ordered in a manner preferential to the intended loading of each voltage supply.

Referring again to FIG. 3, switch 106 is opened for the remainder of the boost cycle. The signal on line 116 is next connected to output line $202_1$ from time $t_1$ to $t_2$; then the signal on line 116 is next connected to output line $202_2$ from time $t_2$ to $t_3$; then the signal on line 116 is next connected to output line $202_3$ from time $t_3$ to $t_4$. The sequence continues until between times $t_4$ and is then the signal on line 116 is connected to output line $202_{p-1}$; and between times $t_5$ and $t_6$ the signal on line 116 is connected to output line $202_p$.

FIG. 3 represents a PWM cycle from time $t_0$ to $t_6$ for the boost phase or cycle. Each of the charge states is terminated at the end of the PWM cycle.

During each of the periods of the PWM cycle, other than the precharge period, the respective capacitors $202_1$ to $202_p$ are charged when the switch of the switched array 201 connects the respective one of the output lines $202_1$ to $202_p$ to the second terminal of the inductor 108 on line 116.

Although it is described that the capacitors are charged in the order $V_1$ to $V_p$, this order is not essential. The only requirement is that in a given PWM boost cycle, the capacitor associated with each voltage level is charged and in addition the inductor is precharged.

For the switch array 201, the length of time spent in each switch state, i.e. the length of time each capacitor is charged for and the length of time of the precharge period, is determined by a comparison of the actual voltage formed on the output line 204 and the desired voltage for that output. Thus the length of each time period of the PWM boost cycle varies in accordance with the criteria to be met for a given output voltage. The higher the voltage level required, the longer the length of time required for boosting the capacitor.

Having described a boost mode of operation for voltage control, a preferred embodiment in a voltage mode control is now described for a buck mode of operation.

Figure 4:
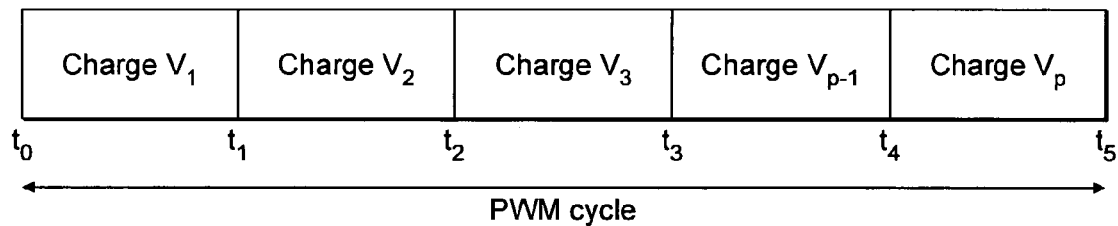
FIG. 4 illustrates a PWM cycle in buck mode for the buck-boost converter of FIG. 2.

FIG. 4 illustrates the switching operation in buck mode. The buck mode is similar to the boost mode, but the precharge cycle is omitted. For the described example, as per the described example of boost mode with respect to FIG. 1, the charging of the output lines occurs in sequence from $V_1$ to $V_p$.

In buck mode, the switch 106 is continuously off. The switches 102 and 103 are controlled in combination with the switching of the switch array 201.

The buck stage 104 is connected to ground whenever the PWM buck ramp criterion of equation 1 is exceeded. The buck stage is connected to ground by closing switch 103 to turn it 'on', and opening switch '102' to turn it 'off'. The switches 102 and 103 are complimentary: when one is closed the other is open, and vice versa.

The length of time that the ground switch 103 is switched to connect the input to the inductor 108 to ground is determined by the error of the voltage signal to which the output of the switch array 201 is currently connected. In buck mode, an error indicates that the battery voltage is too high for the desired voltage level.

The connection to capacitor $202_p$ for voltage $V_p$ is, in the described example, last in the sequence before the end of cycle, the length of time connected to $V_p$ is the residual time left over before the PWM period expires.

In the buck cycle, the switch array 201 is controlled as in the boost mode to switch between the capacitors. The length of time each capacitor is connected to the second terminal of the inductor 108 is determined in the same way as in boost mode.

Thus in both the boost mode and the buck mode, the output voltage generated is compared to a reference voltage to determine how long each individual capacitor is connected by the switch array 201 to the inductor 108.

Figure 5:
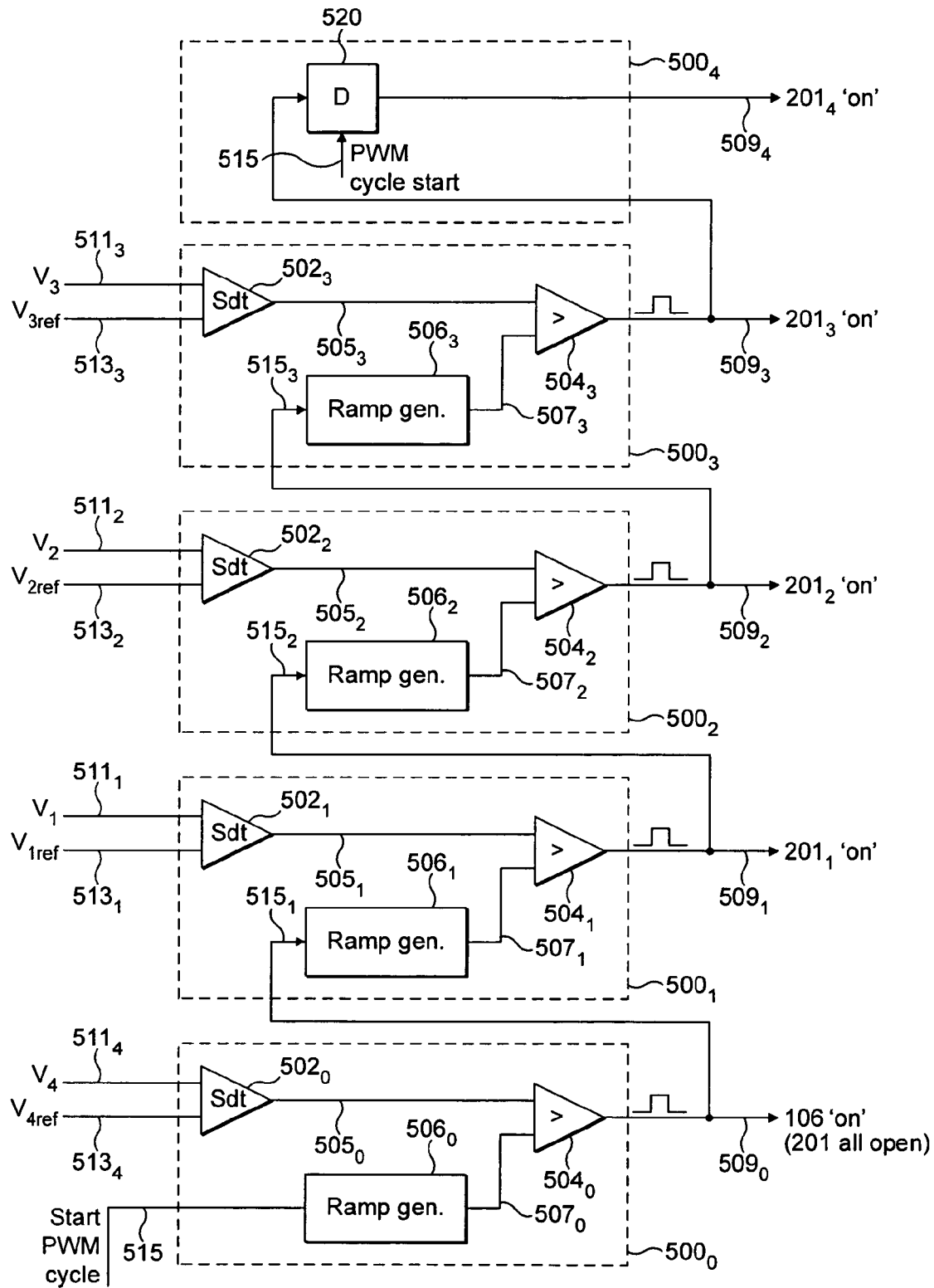
FIG. 5 illustrates voltage control circuitry for the buck-boost converter of FIG. 2 for a boost operation in a voltage control mode.

FIG. 5 shows an exemplary control architecture for the voltage control operation as discussed hereinabove. For the purposes of FIG. 5, it is assumed that there is required to be generated four voltage levels $V_1$ to $V_4$, i.e. p=4.

With reference to FIG. 5, there is illustrated a plurality of voltage control blocks 500 for an exemplary arrangement.

In general, there is provided p+1 voltage control blocks. A first voltage control block, denoted by reference numeral 500$_0$, is associated with a precharge operation in a boost cycle. The remaining voltage control blocks denoted by reference numerals 500$_1$ to 500$_4$ are associated with the charging or discharging in a boost or buck cycle for voltage outputs associated with voltages $V_1$ to $V_4$ respectively.

As described hereinabove with reference to FIG. 3, in a boost operation there is provided a precharge cycle followed by successive charging cycles for the voltages $V_1$ to $V_4$. In a buck cycle, the precharge cycle is eliminated, and there is successive discharge cycles for the voltages $V_1$ to $V_4$. In view of the successive nature of the boost and buck cycles, in the preferred arrangement the voltage control blocks 500 are arranged effectively in a cascaded manner, such that one voltage control block is initiated on determination of another voltage control block.

With further reference to FIG. 5, the operation of the voltage control blocks will now be described.

The voltage control block 500$_0$ for providing precharge in a boost cycle comprises an integrator 502$_0$, a comparator 504$_0$, and a ramp generator 506$_0$. The ramp generator 506$_0$ receives an input signal on line 515, which indicates the start of a PWM cycle. Thus the input signal on line 515 to the ramp generator initiates the start of a boost cycle. The integrator 502$_0$ receives on a first input line 511$_4$ the voltage $V_4$ at the end of the previous PWM cycle, and in addition receives on a second input line 513$_4$ a reference voltage $V_{4ref}$ which represents the desired voltage level for the voltage $V_4$. The integrator 502$_0$ provides an error signal on its output line 505$_0$, which indicates whether the actual voltage level is above or below the desired voltage level, and therefore provides an error signal with information as to the error in the voltage level $V_4$. The comparator 504$_0$ receives the error signal on line 505$_0$ and the output of the ramp generator 506$_0$ on line 507$_0$. The comparator output is provided on line 509$_0$. The output of the comparator controls, during the precharge cycle, the switch 106 and the switch array 201. During the precharge cycle the switch 106 is switched on, and all switches of the switch array 201 are off (or open). At the point in time at which precharge is complete, the signal on line 509$_0$ changes state and switch 106 is turned off, and the switch array 201 is enabled.

On the initiation of the PWM cycle by the signal on line 515, and the consequential starting of the ramp on line 507$_0$, the integrator 504$_0$ generates a positive going edge of a pulse. The negative going edge of the pulse is generated when the comparator inputs change such that the comparator output changes state. Thus the length of the pulse generated by the comparator 504$_0$ on line 509$_0$ determines the duration of the precharge period.

The negative going edge of the pulse generated by the comparator 504$_0$ on line 509$_0$ provides a trigger for the voltage control block 500$_1$ associated with the voltage $V_1$, as will now further be described hereinbelow.

Each voltage control block 500$_1$ to 500$_3$ includes an integrator 502$_1$ to 502$_3$, a comparator 504$_1$ to 504$_3$, and a ramp generator 506$_1$ to 506$_3$.

Each voltage control block 500$_1$ to 500$_3$ is configured to receive as inputs to the integrator 502$_1$ to 502$_3$ a voltage signal and a voltage reference signal on lines 511$_1$ to 511$_3$ and 513$_1$ to 513$_3$ respectively. Each comparator 504$_1$ to 504$_3$ receives as inputs the output of the integrator 502$_1$ to 502$_3$ on line 505$_1$ to 505$_3$, and the output of the ramp generator on line 507$_1$ to 507$_3$. The ramp generator receives as an input an initialisation signal at an input 515$_1$ to 515$_3$. Each voltage control block 500$_1$ to 500$_3$ generates an output on a line 509$_1$ to 509$_3$.

The initialisation signal at the input to the ramp generator 506$_1$ to 506$_3$ of voltage control block 500$_1$ to 500$_3$ is provided by a control signal which indicates the beginning of the boost cycle. The voltage control blocks 500$_1$ to 500$_3$ receive as initialisation signals the outputs on line 509$_1$ to 509$_3$ respectively.

Each integrator 502$_1$ to 502$_3$ integrates the voltage error between a wanted output voltage $V_1$ to $V_3$ received on a signal line 511$_1$ to 511$_3$ and a reference signal, $V_{1ref}$ to $V_{3ref}$ received on a signal line 513$_1$ to 513$_3$. Each integrator 502$_1$ to 502$_3$ thus generates at its output on line 505$_1$ to 505$_3$ a signal which represents the error between the desired output voltage and the actual output voltage.

Each ramp generator 506$_1$ to 506$_3$ is triggered by the termination of the boost period for the previous voltage control level. When the previous voltage control level is terminated a ramp is initiated on output line 507$_1$ to 507$_3$ by the ramp generator 506$_1$ to 506$_3$. The ramp generated has a predetermined fixed rate of rise.

Responsive to initialisation of the ramp generator a rising edge of a pulse signal is generated on line 509$_1$ to 509$_3$.

When the comparator 504$_1$ to 504$_3$ detects that the ramp on line 507$_1$ to 507$_3$ has crossed the integrator output on line 505$_1$ to 505$_3$, a falling edge of a pulse is generated at the output of the comparator 504$_1$ to 504$_3$ on line 509$_1$ to 509$_3$. This indicates that the voltage level has been sufficiently boosted. The boost phase is then terminated for a given voltage level and the switch moves onto the next sequential voltage level.

A switch controller changes the states of switches in the switch array 201 in dependence on the output lines 509$_1$ to 509$_3$.

It will be understood that each of the voltage control blocks 500 of FIG. 5 operates in sequence, and thus only one voltage control block is generating an output at any one time. Thus, in sequence, following the precharge operation provided by voltage control block 500$_0$, the boost of voltage $V_1$ is enabled by voltage control block 500$_1$. On termination of the boost of voltage $V_1$ the voltage control block 500$_2$ is enabled, to boost the voltage $V_2$. On termination of the boost voltage $V_2$, the voltage control block 500$_3$ is enabled to boost the voltage $V_3$.

On termination of the boost of the voltage $V_3$, denoted by a falling edge at the output of the comparator 504$_3$ on line 509$_3$, the voltage control block 500$_4$ associated with voltage $V_4$ is enabled.

The boosting of the voltage $V_4$ is the last boost of the PWM cycle. Thus in the preferred arrangement the boosting of the voltage $V_4$ is provided for the remainder of the PWM cycle. The termination of the boost of voltage $V_4$ is triggered by the termination of the PWM cycle.

Thus, in the preferred arrangement, the voltage control circuit 500$_4$ includes a D-type register 520. The D-type register 520 receives as an input the output on line 509$_3$ of the voltage control stage 500$_3$. The D-type register 520 is set by the falling edge on line 509$_3$, to provide a rising edge on its output on line $509_4$ to start the boost operation for voltage $V_4$. This then continues for the remainder of the PWM cycle.

The D-type register 520 is reset at the start of the PWM cycle by the PWM cycle start signal on line 515, which is the same signal provided to initiate the ramp generator $506_0$ of the precharge voltage control circuit $500_0$.

The circuit of FIG. 5 determines, for each voltage level, how long the capacitor should be charged for, i.e. how long the switch array 201 selects a switch for during a boost operation.

In a boost operation, the length of time the boost precharge switch 106 is on is determined by the output level of integrator $502_0$. However, if the integrator output on line $505_0$ is negative, the boost precharge phase may be skipped, and buck discharge switch 103 enabled instead. This may be enabled for the time that the absolute value of the integrator $502_0$ output is more than ramp on line $507_0$. It is the sign of the integrator output $502_0$ that determines whether the converter is in buck or boost mode. When 103 is engaged this can occur at the same time the voltages $V_1$ to $V_4$ are being boosted, whereas 106 cannot be engaged at the same time $V_1$ to $V_4$ are being boosted. The control operation for switching between boost and buck modes is discussed further hereinbelow with reference to FIG. 7.

The arrangement as described with reference to FIG. 5 produces an accurately regulated supply for an array of supply voltages. However the transient response of the arrangement is not maximised. This is due to two issues. Firstly a complex pole pair exists as a result of the inductor-capacitor resonance on the output. Secondly right-hand plane zeros are present.

The first issue is well known by those skilled in the art of switched mode power supply design, and is typically solved by more advanced control techniques such as current mode control.

The second issue is the result of combining voltage control with a multiple power supply output. When an increase in voltage is required, one of the time periods expands, and this means that the precharge cycle is shortened in order to maintain the overall time period of the PWM cycle. A shortened precharge cycle results in a lower voltage output. After a number of cycles, the influence of all the lowered voltages feeds through such that the precharge time is increased again, and finally voltages are restored to a correct level. This action of reducing the output and then increasing it again introduces an uncompensatable right-hand zero into the response. This arises because the final output is a function of more than one state, and all the states are interdependent. The effect of having a right-hand plane zero is to force more compensation, resulting in slower responses.

The best solution to address this problem is to remove the right hand-plane zero. This may be done by making sure that the control variable does not have any other dependencies. This is achieved with a more advanced control technique in accordance with a preferred embodiment of the invention.

The voltage is increased by adding charge into the output reservoir capacitors $202_1$ to $202_p$. Therefore the control variable is charge. If more voltage output is required, the charge going into the capacitor can simply be increased. Charge is calculated by measuring the current going into the capacitor (i.e. the current of inductor 108) while it is switched on. The integration of inductor current produces a ramp that represents charge. This ramp is terminated when the integrator output reaches the integrated voltage error. If more charge is required to reach the correct voltage, then the on-time of the switch to that capacitor is increased. In this way, each voltage is dependent solely on the length of time that that capacitor is connected, and is not dependent upon any other state.

However, the top voltage stage $V_p$ is reduced by the effect of charge increases on all the preceding stages. If charge control is used for this stage, it conflicts with the charge control for all the other stages. Therefore a different control method is used for the final voltage. Instead of measuring charge, the current during the precharge period is measured as in a prior art boost converter. Closing the switch results in the current increasing. This is increased until the current variable is equal to the integrated output of the error voltage. The precharge period is terminated. However, there is interdependence here. If the charge output from the inductor is increased, this will subtract from the current needed to provide the error voltage. This will introduce a right-hand half plane zero, but this is similar in magnitude to that produced by a prior art boost converter.

The current control on the $V_p$ level is similar to a current controlled single output modulator in that the precharge current terminates at a threshold level set by the error in the output voltage. Exceeding this threshold current trips the output switches to connect to the output rather than ground. The switches are reversed when the cycle is terminated at the end of the boost period.

However, with the multi-output power supply, the inductor current profile changes. The error control comes from the top voltage $V_p$. When in a boost cycle the precharge current is terminated, the output connects to $V_p$ on line $204_p$. The cycle is terminated at the end of the $V_p$ boost, just as with the single output modulator. The difference is that the other outputs are connected in turn after the precharge part of the cycle is terminated. As far as the current control is concerned, the other outputs ($V_p$–1 to $V_1$) form part of the discharge part of the cycle. The intermediate voltages are set by the charge control as already described. This means that all states are to a first approximation separated. $V_p$ is set by the precharge terminating current. Each of $V_{p-1}$ to $V_1$ are set by the charge flowing out into the respective capacitor. If more charge is required, the length of time $V_1$ to $V_{p-1}$ are engaged increases. This forces the length of time $V_p$ is connected to decrease resulting in a similar response to a conventional boost converter.

Figure 6:
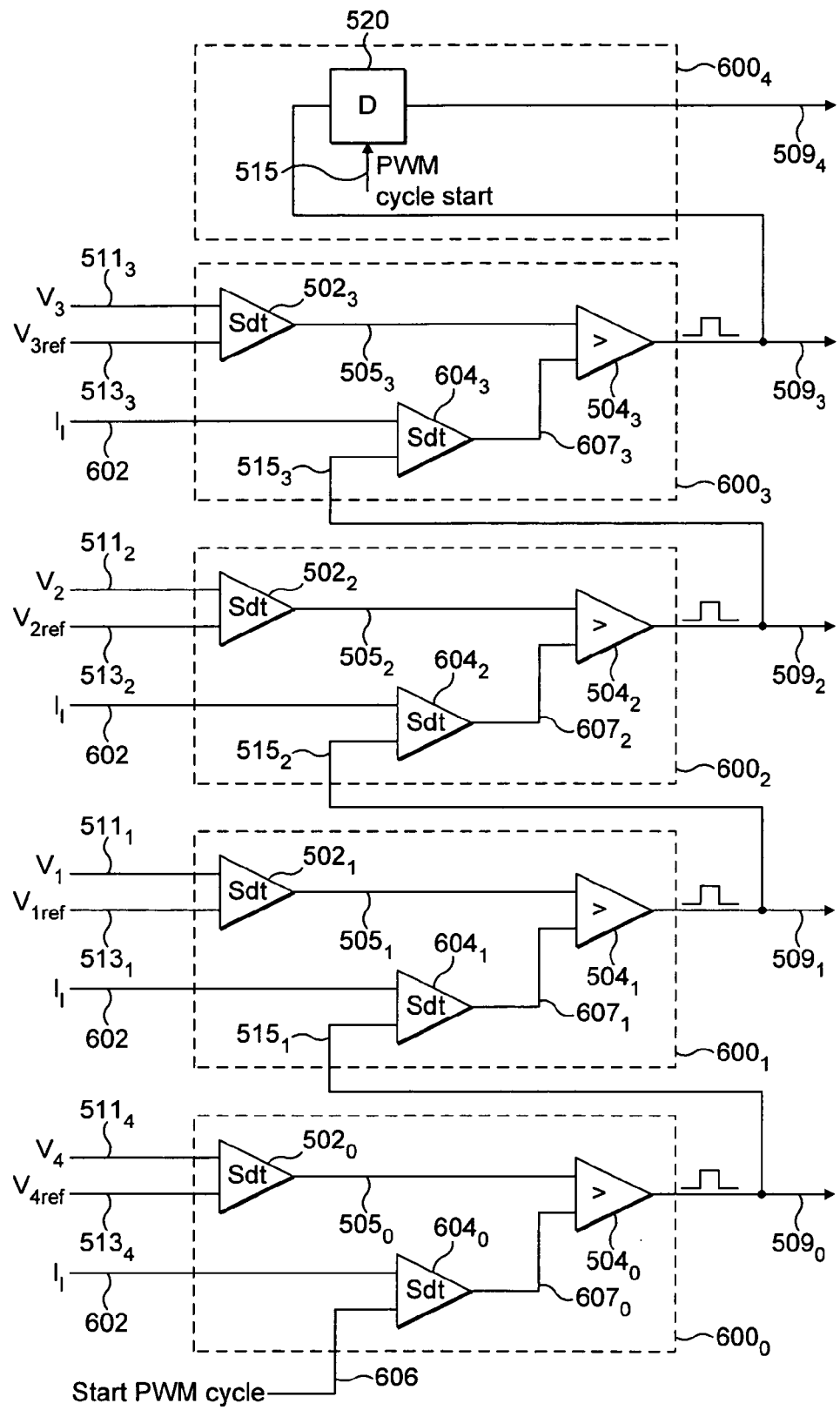
FIG. 6 illustrates voltage control circuitry for the buck-boost converter of FIG. 2 for a boost operation in a current/charge control mode.

With reference to FIG. 6, there is now illustrated an exemplary control architecture for current/charge control operation. The control architecture of FIG. 6 corresponds to that of FIG. 5, with each voltage control block $500_0$ to $500_4$ of FIG. 5 being replaced with a voltage control block $600_0$ to $600_4$. Otherwise in FIG. 6, where elements shown in the figure correspond to elements shown in FIG. 5, and therefore function in the same way, the same reference numerals are used for ease of reference and brevity of description.

Each of the voltage control blocks $600_0$ to $600_3$ of FIG. 6 is adapted relative to the voltage control blocks $500_0$ to $500_3$ of FIG. 5 by substituting the ramp generator blocks $506_0$ to $506_3$ of FIG. 5 with integrators $604_0$ to $604_3$ as shown in FIG. 6.

Each integrator $604_0$ to $604_3$ receives a current signal on a common input line 602. The current signal is the current, $I_1$, flowing in the inductor 108. A second input to the integrator $604_0$ of the voltage control block $600_0$ is provided by the start PWM cycle signal on a line 606. Each integrator $604_1$ to $604_3$ of voltage control block $600_1$ to $600_3$ receives as a second input the initialisation signal on respective lines $515_1$ to $515_3$.

The output of the integrator $604_0$ to $604_3$ in each of the voltage control blocks $600_0$ to $600_3$ is provided on respective lines $607_0$ to $607_3$, and forms a second input to respective comparators $504_0$ to $504_3$. The other input of the comparators $504_0$ to $504_3$ is provided by the outputs of the integrators $502_0$ to $502_3$ consistent with the arrangement of FIG. 5. As in FIG. 5, each comparator $504_0$ to $504_3$ generates an output signal on an output line $509_0$ to $509_3$, to control the switches of the buck-boost converter.

As in the arrangement of FIG. 5, the voltage control circuit $600_4$ is implemented as a D-type register 520, which is initiated with the output of the voltage control block $600_3$.

The architecture of FIG. 6 operates in a similar manner to that of FIG. 5, with a precharge cycle being followed by successive cycles associated with the individual supply voltages. Thus in a boost cycle there is provided a precharge, followed by boost cycles for voltages $V_1$ to $V_4$. In a buck cycle the precharge is bypassed, and there is merely a discharge cycle for each of the voltages $V_1$ to $V_4$.

In general, for each of stages $600_0$ to $600_3$, of FIG. 6, the difference between voltage $V_n$ on line $511_0$ to $511_3$ and $V_{refn}$ on line $513_0$ to $513_3$ is integrated up in integrator $502_0$ to $502_3$. This forms a single pole transfer function.

Additional integrators and proportional elements may be inserted here if higher order control loop functions are required.

Each comparator $504_0$ to $504_3$ compares the signal on input line $505_0$ to $505_3$ with a ramp generated on line $607_0$ to $607_3$ by integrators $604_0$ to $604_3$. The ramp on lines $607_0$ to $607_3$ is created by integration of the current $I_1$ through the inductor 116 provided on the input line 602 to each integrator $602_0$ to $602_3$. This integration is carried out by integrator $602_0$ to $602_3$ on initiation by a signal on line 606 or lines $515_1$ to $515_3$.

At the start of the cycle, integrators $604_0$ to $604_3$ are set to zero. When the cycle is initiated, the output of integrators $604_0$ to $604_3$ are allowed to ramp up. Once the threshold is reached, and comparator $504_0$ to $504_3$ changes state, the switch array 201 is switched as appropriate.

An initiate control signal is obtained from the output of the comparator $504_0$ to $504_3$ on line $509_0$ to $509_3$ that initiates the $V_n$ charge control cycle (or the precharge cycle if n=1). The integrator $604_0$ to $604_3$ is discharged, and the circuit waits until the next charge control cycle is initiated.

The circuit of FIG. 6 allows for control in boost mode or buck mode.

The integrators $502_0$ to $502_3$ may be replaced with an array of integrators and proportional elements depending upon the order of control desired. When the inductor current $I_1$ reaches the same level as the integrator $502_0$ to $502_3$ output, the threshold is said to be reached, and comparator $504_0$ to $504_3$ changes state.

An important characteristic of embodiments of the invention is that the transfer from buck mode to boost mode occurs transparently, and is determined by the ability of the converter to reach the threshold current. This means the converter can be operated, and change mode, seamlessly without external intervention.

However, if the buck-mode trips out before the boost-mode, the current will follow a markedly different path to the boost mode. This would result in a gap in the closed loop response. This would result in unwanted hysteretic oscillations.

To avoid this the ground switch 106 which usually only switches on in a precharge phase of a boost cycle, is preferably turned on for a minimum time window even during buck mode.

Figure 7:
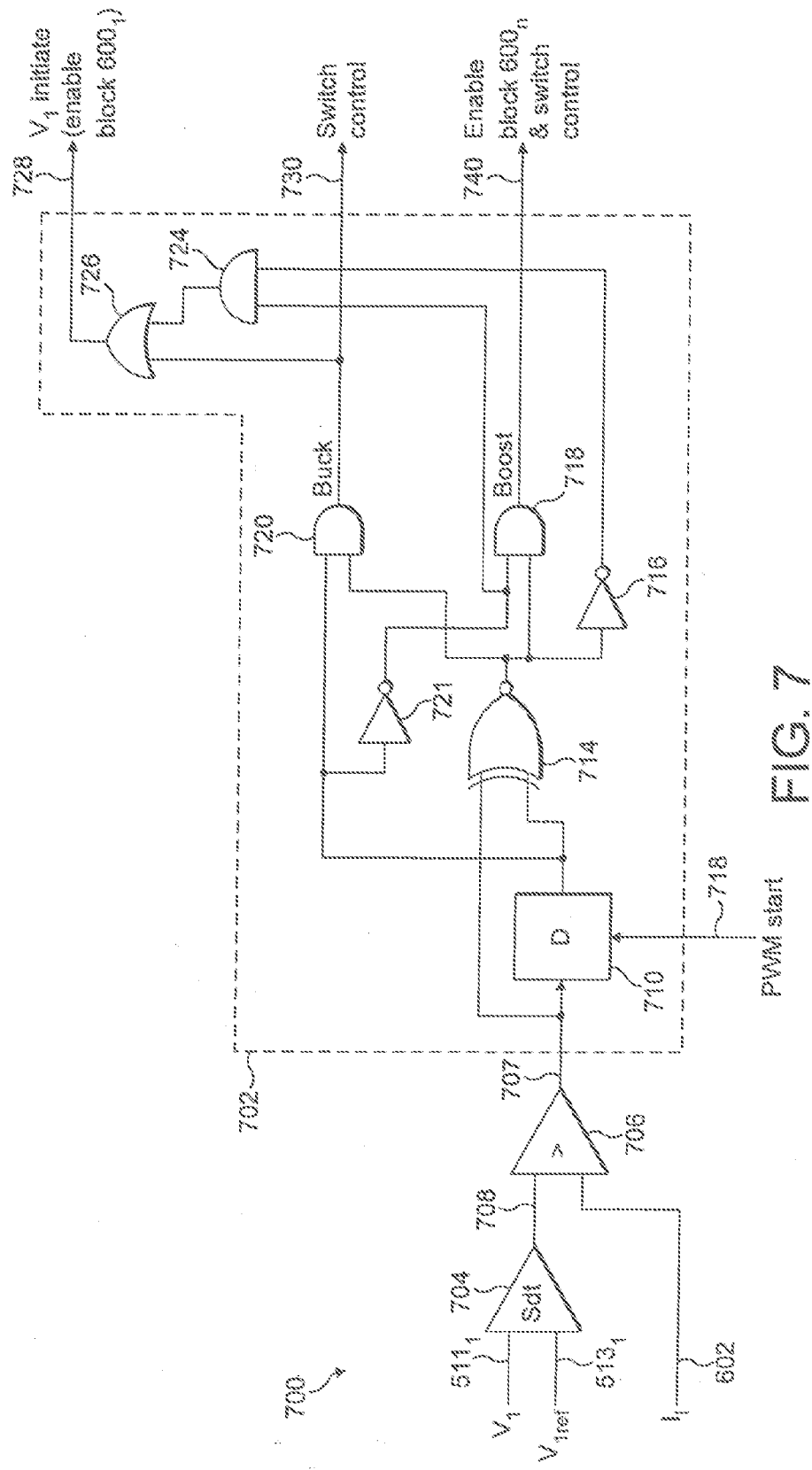
FIG. 7 illustrates control circuitry for selecting between buck and boost modes in a preferred embodiment.
Figure 9:
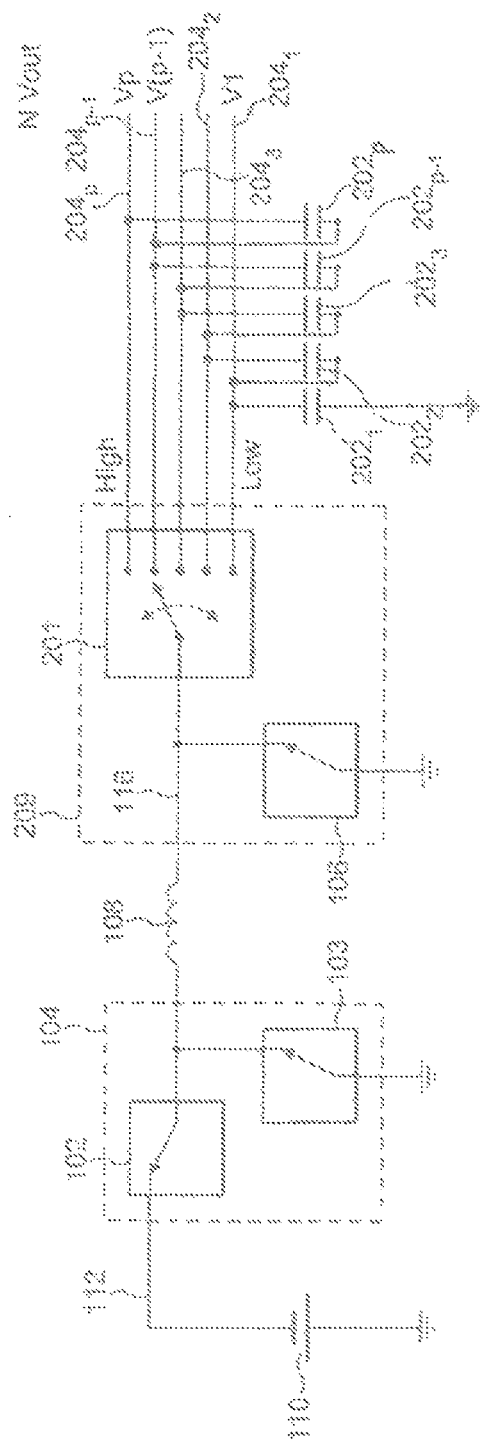
FIG. 9 illustrates a buck-boost converter embodying the principles of the present invention.

With reference to FIG. 7 there is now described control circuitry for selecting between buck and boost modes of operation in a preferred embodiment. Reference numeral 700 of FIG. 7 generally identifies a control block, which includes control logic 702.

The control block includes, in addition to control logic 702, an integrator 704 and a comparator 706. The integrator 704 receives the voltage $V_1$ on line $511_1$ as a first input, and the reference voltage $V_{1ref}$ on line $513_1$. In general, the integrator 704 may be adapted to receive as inputs any one of the voltages $V_1$ to $V_4$, and its associated reference signal. The integrator 704 generates a voltage signal on an output line 708, which represents an error between the two voltages at its input. The error voltage on line 708 forms a first input to the comparator 706, the second input to the comparator 706 being provided by the inductor current $I_1$ on line 602.

In FIG. 7 the control circuitry is described in the context of control for the charge/current arrangement of FIG. 6. In the voltage control arrangement of FIG. 5 the control block 700 may generally be implemented in the same manner as shown with FIG. 7, but rather than providing the inductor current on line 602 to the input of the comparator 706 the line 602 would be connected to ground.

The output of the comparator 706 on line 707 effectively determines whether a boost or a buck cycle is required. If a comparison of the sensed current with the output of the integrator shows that the sense current is less than the voltage signal then a boost operation is required. If the comparison shows that the sense current is greater than the voltage signal then a buck operation is required. Thus the output of the comparator 706 on line 707 indicates whether a buck or boost operation is required.

Control logic 702 of FIG. 7 controls the voltage control stages $600_0$ and $600_1$ of FIG. 6, in either a boost mode or a buck mode, to operate correctly. In addition the control logic 702 controls the switches of the buck-boost converter of FIG. 2 to ensure correct operation.

The control logic 702 includes a D-type register 710, an exclusive-OR gate 714, an inverter 721, an AND gate 720, an AND gate 718, an inverter 716, an AND gate 724, and an OR gate 726.

The D-type register 710 is clocked by the PWM start signal, which is provided on a line 708. Thus at the start of the PWM signal the register is clocked to clock-in the state on the respective input to the output. The D-type register 710 is simply a means of latching the output of the comparator 706, which determines whether the cycle is a buck or a boost cycle.

The input on signal 707 to the control logic 702 will be either high or low in dependence upon whether a buck or boost mode of operation is required, as determined by the output of the comparator 706.

If after the PWM start signal has clocked the D-type register 710 on line 718, the comparator 706 changes state, then this will be detected by the exclusive-NOR gate 714. The exclusive-NOR gate is provided to assert when the input and output of the D-type register are the same, i.e. before the output of comparator 706 changes state, and buck/boost is enabled.

A first input to the AND gate 720 is provided by the output of the D-type register 710, and a first input to the AND gate 718 is provided by the inverse of the output of the D-type register (via inverter 721). A second input to each of the AND gate 718 and 720 is derived from the output of the exclusive-NOR gate 714. Thus each of the AND gate 718 and 720 receive a first common input which is provided by the output of the D-type register 710, and the second input provided to the respective AND gate 718 and 720 is derived from the same source, but with one being inverted. Thus only one of the AND gate 718 and 720 will set a signal at its output once the D-type register 710 transitions to a high state. In this way, either the output of the AND gate 718 or the AND gate 720 is set to a logic high state in dependence upon the output of the exclusive-NOR gate 714. Based on the output of the exclusive-NOR gate 714, the output of the AND gate 720 is set high in the event that a buck mode of operation is required, and the output of the AND gate 718 is set high in the event of a boost operation being required.

The AND gates 718 and 720 propagate the buck/boost enabled state through to the buck/boost switches, i.e. switches 102, 103 and 106 of FIG. 2. This selects either the buck switch state (102 off, 103 on) or boost switch state (106 on).

The output of the AND gate 718 on line 740 is used to enable block $600_0$ of FIG. 6 in the event of boost operation. In addition the signal on line 740 is used to control the configuration of the switches of the buck-boost converter of FIG. 2 for a precharge operation.

In the event of a buck operation, the signal at the output of the AND gate 720 on line 730 is similarly used to control switches in the buck-boost converter of FIG. 3.

An inverted (by inverter 721) output of the D-type register 710 forms a first input to the AND gate 724. The second input of the AND gate 724 is provided by the inverted output, provided by the inverter 716, of the exclusive-NOR gate 714. The output of the AND gate 724 provides an input to the OR gate 726, which provides a signal on line 728 which is the initialisation signal for the block $600_1$ of the arrangement of FIG. 6, in either a boost or a buck mode of operation.

When in a buck state, the output of AND gate 720 is asserted and this is transmitted through OR gate 726 to enable the next stage. When in a boost state, the output of AND gate 720 is not asserted. However, inverter 721 means one of the inputs to AND gate 724 is asserted in boost mode. The inverter 716 means that the other input to the AND gate 724 is asserted at the end of the boost precharge when the comparator 706 changes state. This means that the initiate signal on line 728 propagates at the end of the boost precharge period.

Thus the logic 702 operates such that in the event of a buck mode of operation, the initiate signal on line 728 is set immediately the buck mode of operation is detected as being required. However in the event of a boost mode of operation being detected, the logic allows the initialisation signal on line 728 to be delayed until a precharge operation has been completed.

Thus the output of the AND gate 718 on line 740 provides for initiation of the precharge cycle, but following the precharge cycle the output of the AND gate 724 controls initialisation of the first voltage boost in block $600_1$ of FIG. 6. The switchover from precharge to voltage boost cycle between block $600_0$ and $600_1$ in FIG. 6 is determined by the output of the comparator 706 changing state.

It can thus be understood that the control block of FIG. 7 allows for the automatic detection of whether a buck or a boost mode of operation should be implemented. A transition from a buck mode to a boost mode or from a boost mode to a buck mode can only take place at the transition of a PWM cycle. Once a PWM cycle has begun in either buck or boost mode, then it remains in that mode for its entire duration.

It can be understood from the above discussion with reference to FIG. 7 that the decision as to whether to implement a buck mode or boost mode of operation is taken at the beginning of the PWM cycle, responsive to the PWM start signal. Responsive to the PWM start signal the output of the comparator 706 is assessed in order to determine whether boost or buck is required. In a boost operation the output of the comparator is further monitored to determine when precharge has been completed to begin the boosting of the individual voltage levels. Any further change in the output of the comparator during the boost cycle has no input on the PWM cycle. In addition in a buck mode of operation, once the initial termination to begin a buck PWM cycle is made, then any change in the output state of the comparator has no effect on the current PWM cycle.

It should be noted that the choice in FIG. 7 to base the integration and comparison provided by the integrator 704 of comparator 706 on the voltage level $V_1$ and its associated reference level is arbitrary. Any particular voltage level may be chosen for determination of whether a buck or boost mode of operation should be initiated.

The invention has been described herein by way of reference to particular examples and embodiments, for the purposes of illustrating the invention and its embodiments. The invention is not limited to the specifics of any embodiment descried herein. Any feature of any embodiment may be implemented in combination with features of other embodiments, no embodiment being exclusive. The scope of the invention is defined by the appended claims.

What is claimed is:

1. A voltage generation apparatus comprising:
    a voltage source;
    an inductor, having a first terminal connected by a first switch to the voltage source connected by a fourth switch to electrical ground, and a second terminal connected by a third switch to electrical ground;
    a plurality of capacitors each having a first terminal connected by a second switch to the second terminal of the inductor, wherein a respective plurality of voltages are formed across the plurality of capacitors, each voltage being independently regulated by a connection of the first terminal of the inductor to the voltage source, wherein each of the plurality of capacitors is electrically connected to the second terminal of the inductor in a cycle; and
    a controller for selecting between a buck mode and a boost mode on initiation of each cycle in dependence upon a relationship between a supply voltage of the voltage source and a time average voltage based on the plurality of voltages across the plurality of capacitors in a period of the cycle.

2. The voltage generation apparatus according to claim 1 wherein at least one of the plurality of capacitors has a second terminal connected to the first terminal of another one of the plurality of capacitors.

3. The voltage generation apparatus according to claim 1 wherein the controller sequentially connects each capacitor to the second terminal of the inductor.

4. The voltage generation apparatus according to claim 3 wherein the controller, in the boost mode disconnects the second terminal of the inductor from the electrical ground when any of the plurality of capacitors are connected to the second terminal of the inductor.

5. The voltage generation apparatus according to claim 3 wherein the controller, in the boost mode connects the second terminal of the inductor to ground and disconnect all of the plurality of capacitors from the second terminal of the inductor, to precharge the inductor.

6. The voltage generation apparatus according to claim 1 wherein the controller, in the boost mode connects the first terminal of the inductor to the voltage source and disconnect the second terminal of the inductor from electrical ground.

7. The voltage generation apparatus according to claim 3 wherein the controller, in the buck mode disconnects the second terminal of the inductor from electrical ground.

8. The voltage generation apparatus according to claim 7 wherein the controller, in the buck mode selectively connects the first terminal of the inductor to either the voltage source or electrical ground.

9. A method of generating a plurality of voltages in a voltage generation apparatus comprising:
- selectively connecting a voltage source to a first terminal of an inductor;
- selectively connecting a second terminal of the inductor to electrical ground;
- selectively connecting the first terminal of the inductor to electrical ground;
- selectively connecting one of a plurality of capacitors to the second terminal of the inductor, wherein a respective plurality of voltages are formed across the plurality of capacitors, each voltage being independently regulated by a connection of the first terminal of the inductor to the voltage source;
- electrically connecting each of the plurality of capacitors to the second terminal of the inductor in a cycle; and
- selecting between a buck mode and a boost mode on initiation of each cycle in dependence upon a relationship between a supply voltage of the voltage source and a time average voltage based on the plurality of voltages across the plurality of capacitors in a period of the cycle.

10. The method according to claim 9 further comprising sequentially connecting each capacitor to the second terminal of the inductor.

11. The method according to claim 10 further comprising, in the boost mode:
- disconnecting the second terminal of the inductor from the electrical ground when any of the plurality of capacitors are connected to the second terminal of the inductor;
- connecting the second terminal of the inductor to ground and disconnecting all of the plurality of capacitors from the second terminal of the inductor, to precharge the inductor; and
- connecting the first terminal of the inductor to the voltage source and disconnecting the second terminal of the inductor from electrical ground.

12. The method according to claim 10 further comprising, in the buck mode:
- disconnecting the second terminal of the inductor from electrical ground; and
- selectively connecting the first terminal of the inductor to either the voltage source or electrical ground.

13. The method according to claim 9 wherein selectively connecting one of the plurality of capacitors to the second terminal of the inductor comprises, for a given voltage level:
- generating an error signal representing the difference between the current output voltage level and a reference level; and
- comparing the error signal to a ramp signal, wherein the capacitor for said voltage level is selectively connected in dependence on the comparison.

14. The method according to claim 9 wherein selectively connecting one of the plurality of capacitors to the second terminal of the inductor comprises, for a given voltage level:
- generating an error signal representing the difference between the current output voltage level and a reference level; and
- comparing the error signal to a current level in the inductor, wherein the capacitor for said voltage level is selectively connected in dependence on the comparison.

15. The method according to claim 13 wherein the capacitor is connected on initialization of the comparing and disconnected in dependence on the comparison indicating a change.

16. The method according to claim 14 wherein the capacitor is connected on initialization of the comparing and disconnected in dependence on the comparison indicating a change.

17. The voltage generation apparatus according to claim 1 wherein each of the plurality of capacitors has a second terminal connected to electrical ground.

18. The method according to claim 9 wherein each of the plurality of capacitors has a second terminal connected to electrical ground.

19. The method according to claim 9 a wherein at least one of the plurality of capacitors has a second terminal connected to the first terminal of another one of the plurality of capacitors.

* * * * *